Figure 1:
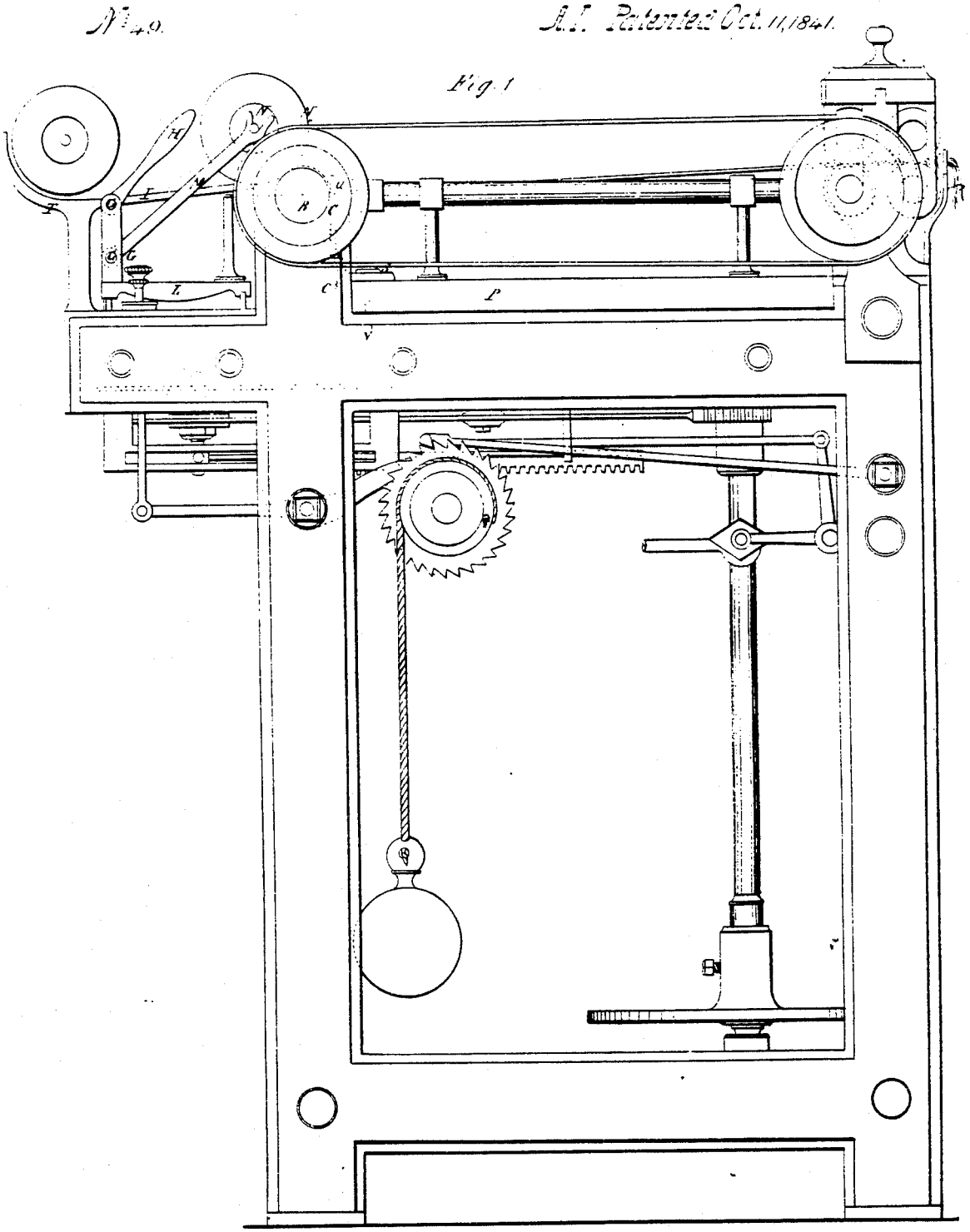

BEST AVAILABLE COPY

Sheet 1 2 Sheets.

J. Whitehead.

Carding Mach.

No. 40.

A.I. Patented Oct. 11, 1841.

H. PETERS, PHOTO-LITHOGRAPHER, WASHINGTON, D. C.

J. Whitehead.
Carding Mach.
BEST AVAILABLE COPY
No. 49.
A.I. Patented Oct. 11, 1841.
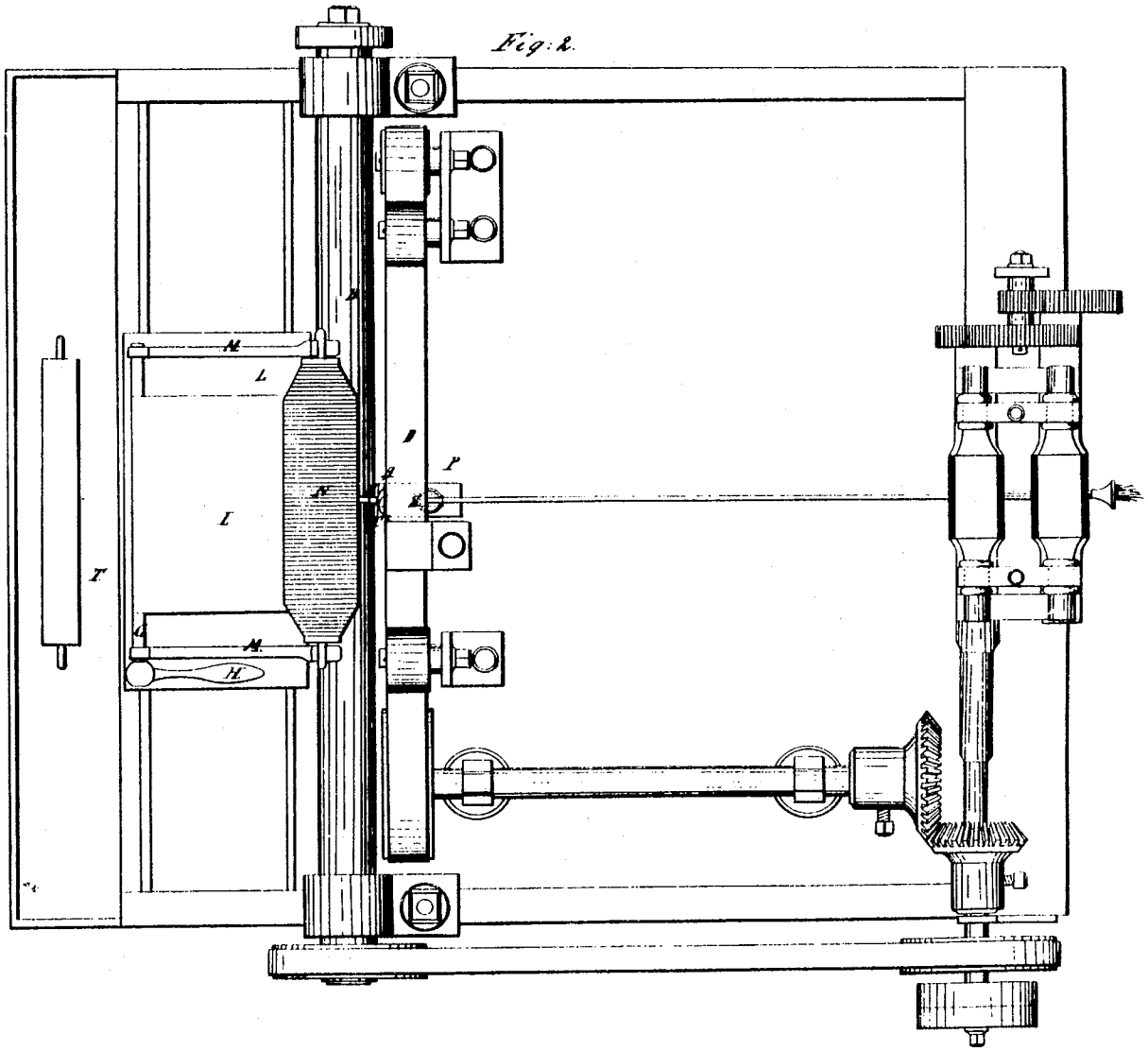
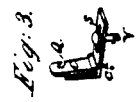
H. PETERS, PHOTO-LITHOGRAPHER, WASHINGTON, D. C.